(12) United States Patent
Bansal et al.

(10) Patent No.: US 11,586,506 B2
(45) Date of Patent: Feb. 21, 2023

(54) SYSTEM AND METHOD FOR INDEXING IMAGE BACKUPS

(71) Applicant: EMC IP Holding Company LLC, Hopkinton, MA (US)

(72) Inventors: Aaditya Rakesh Bansal, Bangalore (IN); Manish Sharma, Bangalore (IN); Sunil Yadav, Bangalore (IN); Shelesh Chopra, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 370 days.

(21) Appl. No.: 16/669,433

(22) Filed: Oct. 30, 2019

(65) Prior Publication Data

US 2021/0133040 A1    May 6, 2021

(51) Int. Cl.
 *G06F 12/00*  (2006.01)
 *G06F 11/14*  (2006.01)
 *G06F 16/13*  (2019.01)
 *G06F 16/14*  (2019.01)

(52) U.S. Cl.
 CPC ...... *G06F 11/1461* (2013.01); *G06F 11/1451* (2013.01); *G06F 11/1464* (2013.01); *G06F 11/1469* (2013.01); *G06F 16/13* (2019.01); *G06F 16/14* (2019.01)

(58) Field of Classification Search
 CPC ............. G06F 11/1461; G06F 11/1451; G06F 11/1464; G06F 11/1469; G06F 16/14; G06F 16/13; G06F 3/0646; G06F 3/0647; G06F 3/065
 See application file for complete search history.

(56) References Cited

U.S. PATENT DOCUMENTS

| | | |
|---|---|---|
| 6,408,336 B1 | 6/2002 | Schneider et al. |
| 8,554,918 B1 | 10/2013 | Douglis |
| 8,812,455 B1 | 8/2014 | Claudatos et al. |
| 9,298,707 B1 | 3/2016 | Zhang et al. |
| 9,430,332 B1 | 8/2016 | Bahadure |
| 9,772,791 B2 | 9/2017 | Resch |
| 9,977,704 B1 | 5/2018 | Chopra et al. |
| 10,102,083 B1 | 10/2018 | Dobrean et al. |
| 10,320,757 B1 | 6/2019 | Secker-walker |
| 10,417,213 B1 | 9/2019 | Mukku et al. |
| 10,489,066 B1 | 11/2019 | Krinke |
| 10,572,350 B1 | 2/2020 | Bansal et al. |
| 10,642,698 B1 | 5/2020 | Chopra et al. |
| 11,265,148 B1 | 3/2022 | Griffin et al. |
| 11,297,459 B2 | 4/2022 | Raduchel et al. |
| 2008/0086609 A1 | 4/2008 | Lesser et al. |
| 2010/0058114 A1 | 3/2010 | Perkins et al. |
| 2010/0250497 A1 | 9/2010 | Redlich et al. |
| 2011/0113012 A1 | 5/2011 | Gruhl et al. |

(Continued)

*Primary Examiner* — Shawn X Gu
(74) *Attorney, Agent, or Firm* — Chamberlain, Hrdlicka, White, Williams & Aughtry

(57) ABSTRACT

A backup manager for providing backup services includes persistent storage and a backup orchestrator. The persistent storage includes protection policies. The backup orchestrator generates a backup for a client based on the protection policies; identifies a portion of the backup that includes an allocation scheme; extracts system metadata from the backup using the allocation scheme; generates an index for the backup using the system metadata; and stores the backup and the index in backup storage.

16 Claims, 9 Drawing Sheets

(56) References Cited

U.S. PATENT DOCUMENTS

| | | |
|---|---|---|
| 2011/0131185 A1 | 6/2011 | Kirshenbaum |
| 2011/0213928 A1 | 9/2011 | Grube et al. |
| 2013/0091536 A1 | 4/2013 | Manjunath |
| 2014/0115029 A1 | 4/2014 | Baldwin et al. |
| 2014/0136832 A1 | 5/2014 | Klum et al. |
| 2014/0310800 A1 | 10/2014 | Kabra et al. |
| 2014/0351632 A1 | 11/2014 | Grube et al. |
| 2015/0046192 A1 | 2/2015 | Raduchel |
| 2015/0066865 A1 | 3/2015 | Yara |
| 2015/0066866 A1 | 3/2015 | Yara |
| 2015/0169898 A1 | 6/2015 | Lembcke |
| 2015/0242648 A1 | 8/2015 | Lemmey |
| 2016/0034133 A1 | 2/2016 | Wilson et al. |
| 2016/0132521 A1 | 5/2016 | Reininger |
| 2016/0179416 A1 | 6/2016 | Mutha et al. |
| 2016/0274978 A1 | 9/2016 | Strohmenger et al. |
| 2016/0357971 A1 | 12/2016 | Sinha et al. |
| 2016/0371500 A1 | 12/2016 | Huang et al. |
| 2017/0371547 A1 | 12/2017 | Fruchtman et al. |
| 2018/0032446 A1 | 2/2018 | Amarendran et al. |
| 2018/0067848 A1 | 3/2018 | Baldwin |
| 2018/0089044 A1 | 3/2018 | Guim et al. |
| 2018/0157860 A1 | 6/2018 | Nair et al. |
| 2018/0159729 A1 | 6/2018 | Deshmukh et al. |
| 2018/0225177 A1 | 8/2018 | Bhagi et al. |
| 2018/0232528 A1 | 8/2018 | Williamson et al. |
| 2019/0057101 A1 | 2/2019 | Esserlieu et al. |
| 2019/0158596 A1 | 5/2019 | Mcshane et al. |
| 2019/0205056 A1 | 7/2019 | Halstuch |
| 2019/0312910 A1 | 10/2019 | Convertino et al. |
| 2019/0332683 A1 | 10/2019 | Thummala et al. |
| 2019/0354708 A1 | 11/2019 | Fisher et al. |
| 2020/0012431 A1 | 1/2020 | Chopra et al. |
| 2020/0233975 A1 | 7/2020 | Rosenthol et al. |
| 2020/0241908 A1* | 7/2020 | Dornemann ........ G06F 11/2094 |
| 2020/0241975 A1 | 7/2020 | Basham et al. |
| 2020/0285771 A1 | 9/2020 | Dey et al. |
| 2020/0301882 A1 | 9/2020 | Pogde et al. |
| 2020/0302082 A1 | 9/2020 | Carteri et al. |
| 2020/0320208 A1 | 10/2020 | Bhosale et al. |
| 2021/0034571 A1 | 2/2021 | Bedadala et al. |
| 2021/0035089 A1 | 2/2021 | Johnston |
| 2021/0117277 A1 | 4/2021 | Shetty et al. |
| 2021/0133040 A1 | 5/2021 | Bansal et al. |
| 2021/0133248 A1 | 5/2021 | Sharma et al. |

\* cited by examiner

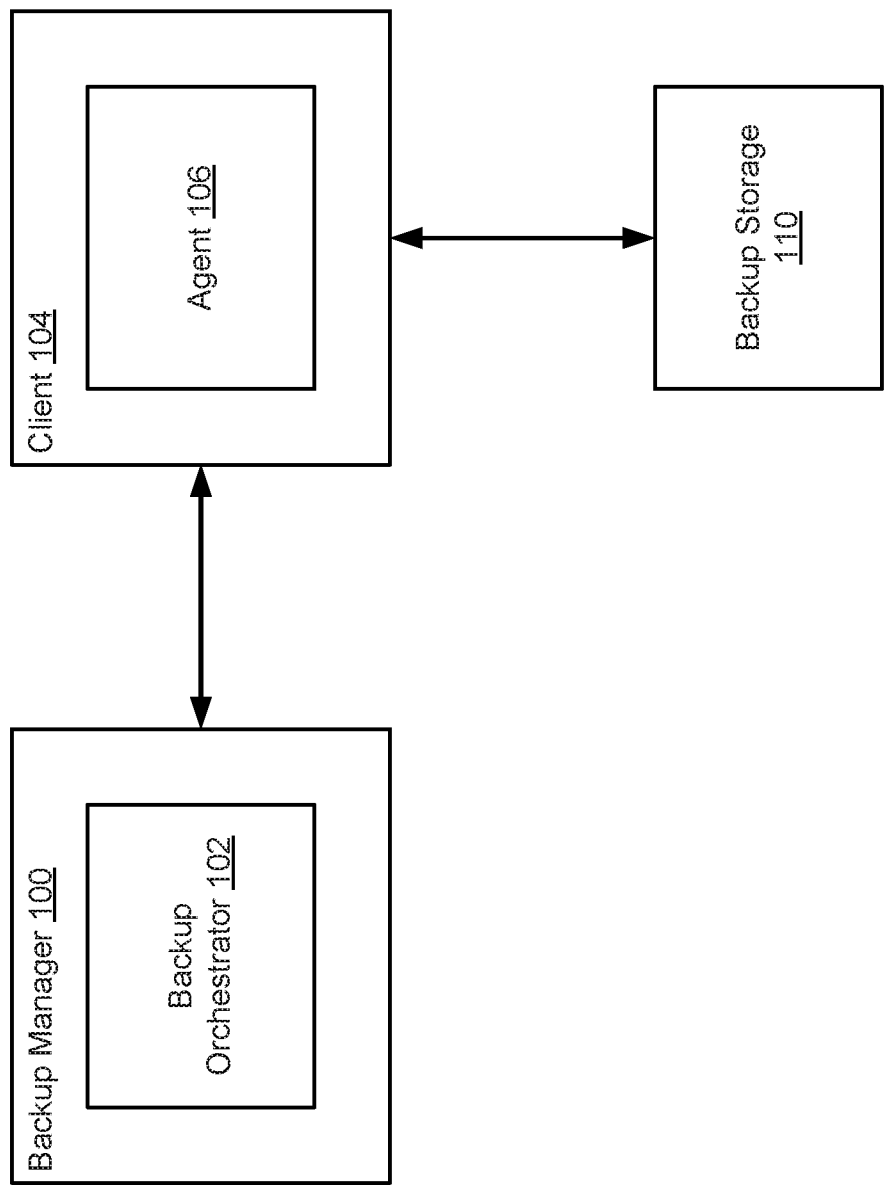
FIG. 1.1

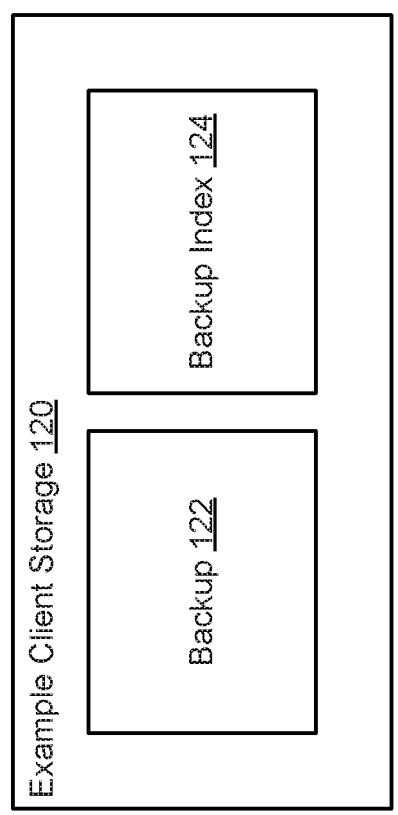
FIG. 1.2

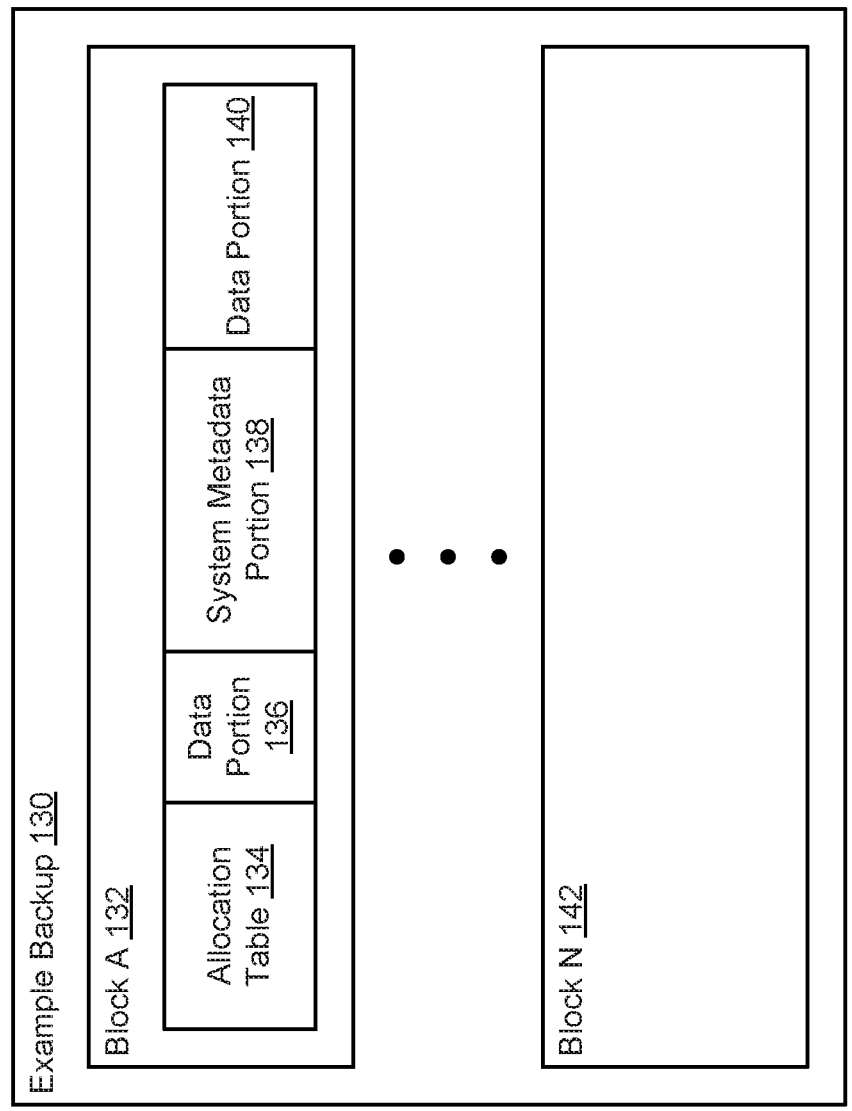
FIG. 1.3

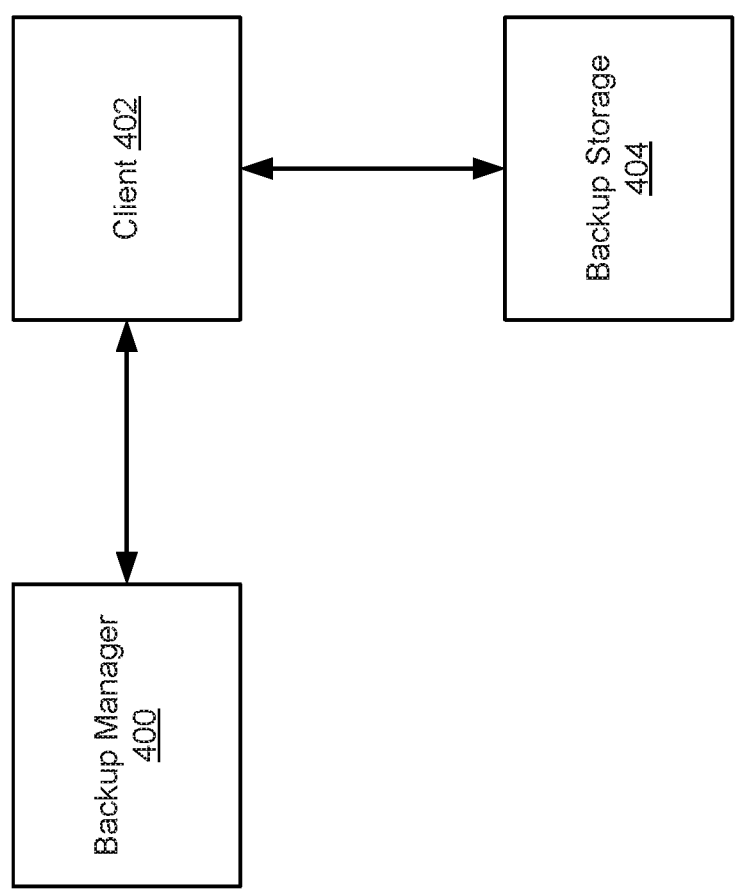
FIG. 4.1

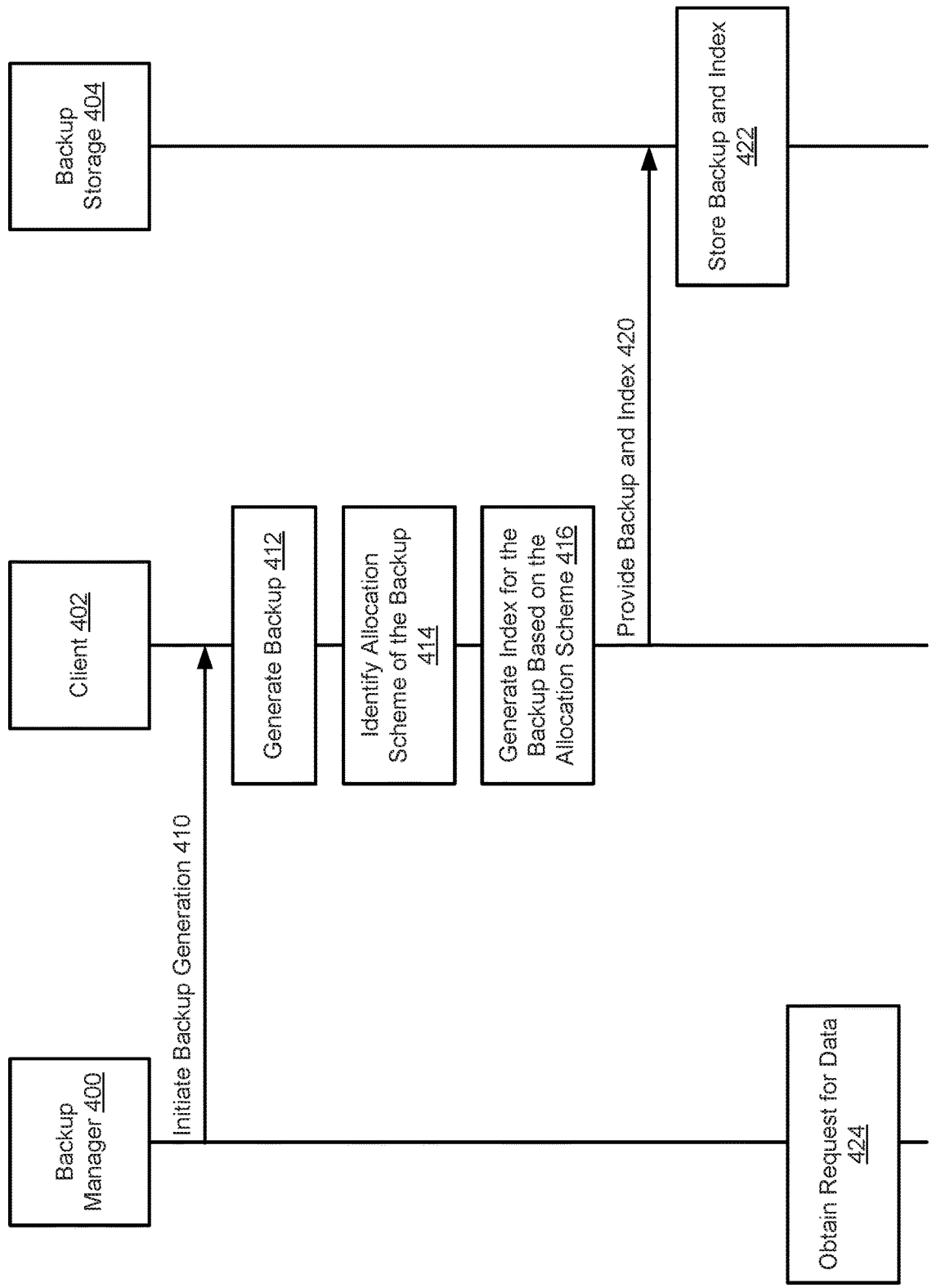
FIG. 4.2

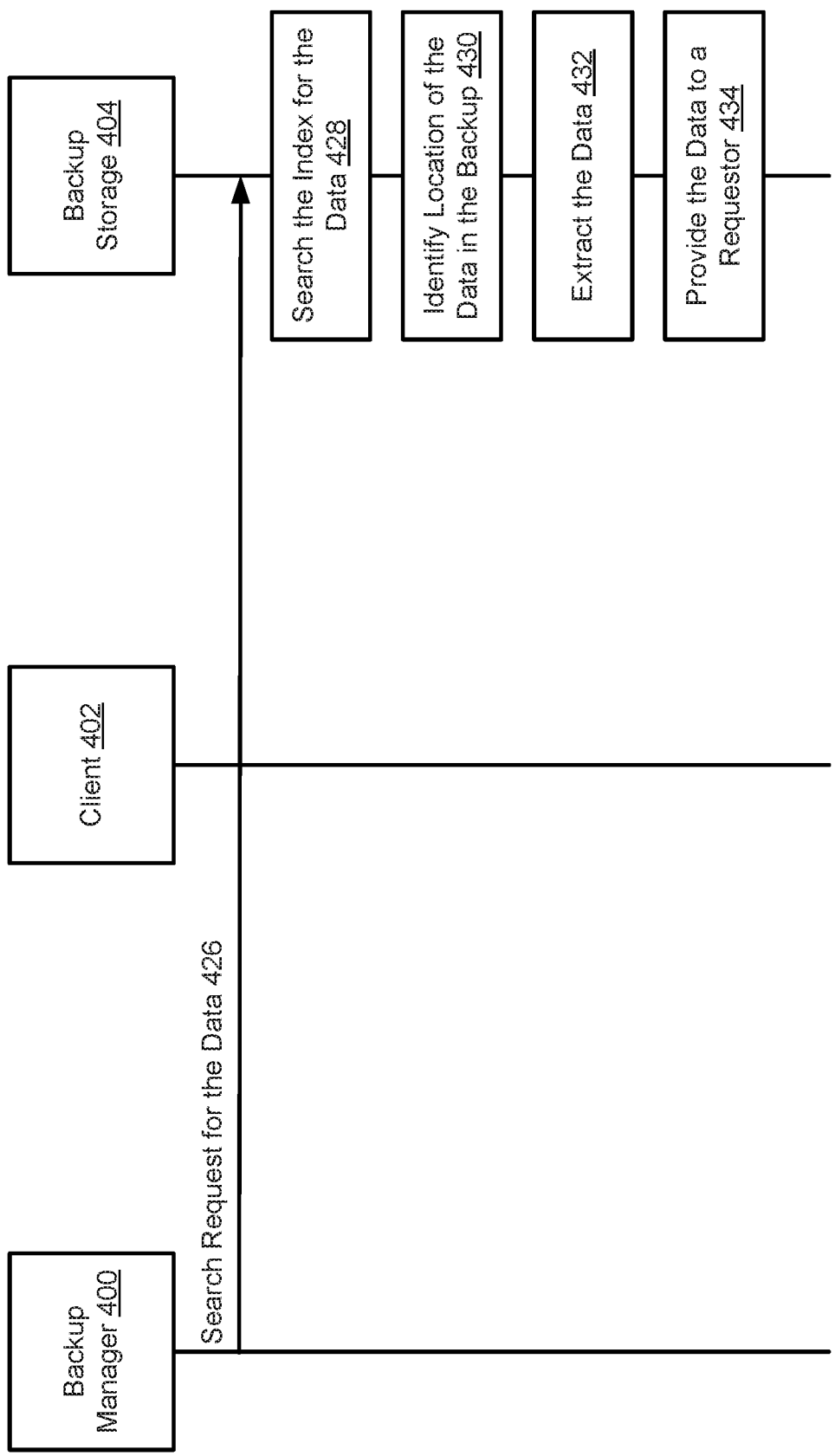
FIG. 4.3

SYSTEM AND METHOD FOR INDEXING IMAGE BACKUPS

BACKGROUND

Devices may generate information based on existing information. For example, devices may obtain information and derive information based on the obtained information. To obtain information, devices may be able to communicate with other devices. The communications between the devices may be through any means.

SUMMARY

In one aspect, a backup manager for providing backup services in accordance with one or more embodiments of the invention includes persistent storage and a backup orchestrator. The persistent storage includes protection policies. The backup orchestrator generates a backup for a client based on the protection policies; identifies a portion of the backup that includes an allocation scheme; extracts system metadata from the backup using the allocation scheme; generates an index for the backup using the system metadata; and stores the backup and the index in backup storage.

In one aspect, a method for providing backup services in accordance with one or more embodiments of the invention includes generating a backup for a client based on a protection policy associated with the client; identifying a portion of the backup that includes an allocation scheme; extracting system metadata from the backup using the allocation scheme; generating an index for the backup using the system metadata; and storing the backup and the index in backup storage.

In one aspect, a non-transitory computer readable medium in accordance with one or more embodiments of the invention includes computer readable program code, which when executed by a computer processor enables the computer processor to perform a method for providing backup services. The method includes generating a backup for a client based on a protection policy associated with the client; identifying a portion of the backup that includes an allocation scheme; extracting system metadata from the backup using the allocation scheme; generating an index for the backup using the system metadata; and storing the backup and the index in backup storage.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an example client storage in accordance with one or more embodiments of the invention.

FIG. 1.3 shows a diagram of an example backup in accordance with one or more embodiments of the invention.

FIG. 4.1 shows a diagram of an example system.

FIGS. 4.2-4.3 show diagrams of interactions between and actions performed by components of the example system of FIG. 4.1 over time.

DETAILED DESCRIPTION

Figure 2:
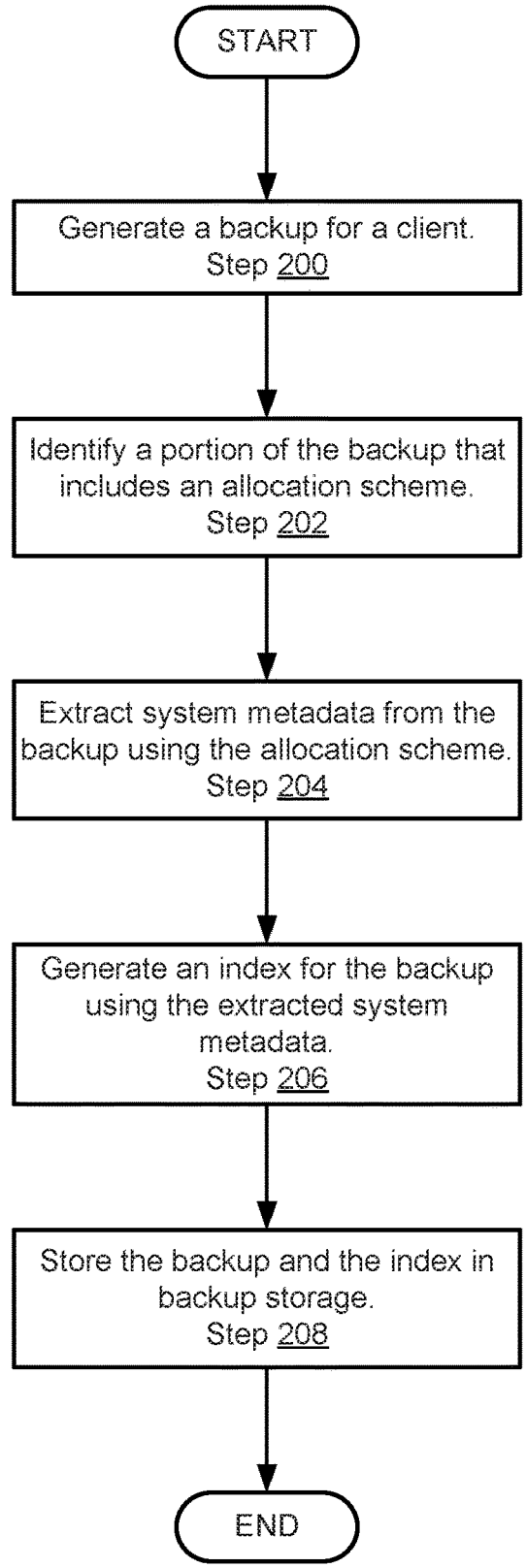
FIG. 2 shows a flowchart of a first method of providing backup services in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for providing backup services to clients or other types of devices. Backup services may include generating backups of the clients, storing the backups, using the backups to restore clients to previous states, and enabling the contents of the backups to be searched.

Embodiments of the invention may provide a method for generating and storing backups in a searchable format. A backup may be a data structure that may be used to restore an entity. The backup may include any number of logical portions (e.g., files). To determine whether to restore an entity, the contents of the backups may be searched to ascertain whether restoring the entity using the backup would enable desirable data to be accessed.

Embodiments of the invention may provide a method for generating searchable backups in a computationally efficient manner. To do so, a system in accordance with embodiments of the invention may utilize existing information stored as part of the backup generation process to ascertain the contents and relative locations of different portions of the contents of a backup. By doing so, computationally expensive processes such as, for example, crawling of the contents of the backups to obtain information regarding the contents of a backup may be avoided.

FIG. 1.1 shows a system in accordance with one or more embodiments of the invention. The system may include a client (104) that utilizes backup services provided by the backup manager (100), an agent hosted by the client (104) and/or a backup storage (110). The backup services may include (i) generation of backups of the client (104), (ii) storing the backups in a backup storage (110), (iii) utilizing backups of the client (104) stored in the backup storage (110) to restore the client (104), and/or (iv) searching portions of stored backups for data that may be of interest to the client (104) and/or other entities.

For example, backups of the client (104) may be data structures that include data reflecting the state of the client (104) at a point of time (e.g., a full backup) and/or changes in the state of the client (104) over a period of time (e.g., an incremental backup). Different portions of the backup may correspond with different portions of the client's (104) data (e.g., files of a file system is used to organize the client's data or other types of data structures that may be employed by other types of data organization systems) at the point/period of time.

The backups may be used to change the data of the client (104) to reflect the data at periods of time associated with backups. Once changed, the state of the client (104) may be similar to the state of the deployment when the backups were generated. Thus, the backups may be used to restore the operational state of the client (104) to previous operational states. The aforementioned functionality may be desirable, for example, to respond to scenarios in which the client (104) becomes inoperable due to data corruption, hardware issues that prevent the client (104) from operating, and/or for other reasons.

In some scenarios, it may be desirable to ascertain whether the client (104), during a previous operating state associated with backups stored in the backup storage (110), stored a particular portion of data. For example, the particular portion of data may be a version of a database, a file, or another type of data structure. The aforementioned determination may be used, for example, to select to which operating state to restore the client (104) when performing a restoration of the client (104), enable access to the particular portion of data by extracting it from a backup, and/or for other purposes.

To enable the backups to be searched, the system may store metadata regarding the contents of the backups that are stored in backup storage (110). The metadata may enable the contents of the backups to be searched without crawling the contents of the backups or employing other computationally costly search algorithms.

To store the metadata, embodiments of the invention may provide a method of generating the metadata without crawling the contents of the backups. The method may generate the metadata by utilizing existing, organizational scheme metadata employed by the client (104) to organize the client data. Consequently, a system in accordance with embodiments of the invention may provide search functionality for backups of the client (104) in a manner that is computationally efficient.

Each of the components of the system may be operably connected to each other and/or other entities not shown using any combination and quantity of wired and/or wireless networks. Each component of the system is discussed below.

The client (104) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform all, or a portion, of the functions described in this application and/or all, or a portion, of the methods illustrated in FIGS. 2-3. The client (104) may be implemented using other types of computing devices without departing from the invention. For additional details regarding computing devices, refer to FIG. 5.

The client (104) may be implemented using logical devices without departing from the invention. For example, the client (104) may be implemented using virtual machines that utilize computing resources of any number of physical computing devices to provide the functionality of the client (104). The client (104) may be implemented using other types of logical devices without departing from the invention.

In one or more embodiments of the invention, the client (104) provides computer implemented services. A computer implemented service may be, for example, managing a database, serving files, and/or providing other types of services that may be utilized by users. The computing implemented services may be other types of services without departing from the invention.

When providing computer implemented services, the client (104) may generate and store data which the client (104) utilizes to provide the computer implemented services. For example, to provide database services, the client (104) may store information from a user in a database. The user may desire access to the information in the future. Consequently, the future availability of the data stored in the data may be valuable to the client (104).

Similarly, other entities may desire access to all, or a portion, of the client's data at future points in time. For example, other entities may desire to obtain access to information included in a database hosted by the client (104).

To improve the likelihood that such data is available in the future, the client (104) may utilize backup services provided by the backup manager (100). As discussed above, the backup services provided by the backup manager (100) may include orchestration of backup generation, storage of backups in the backup storage (110), and/or providing access to backups and/or information included in the backups (e.g., particular files).

To assist the backup manager (100) in providing backup services, the client (104) may host an agent (106). The agent (106) may orchestrate generation of backups of the client (104). To do so, the agent (106) may invoke functionality of the client (104) to generate the backup. For example, the agent (106) may invoke the functionality of the client (104) to cause the client (104) to enter a consistent state (e.g., flush buffers or other in-memory data structures) and generate a backup of all, or a portion, of the client data. Once generated, the agent (106) may generate a backup index for the generated backup. The backup index may reflect the content (e.g., different logical portions of the backup such as files) of the backup.

To generate the backup index, the agent (106) may utilize system metadata (or other types of metadata used to organize/describe logical portions of the client's data included in the backup) stored in the backup to generate the backup index. For additional details regarding backups and backup indexes, refer to FIGS. 1.2-1.3.

The agent (106) may be implemented using a logical entity. For example, the agent (106) may be implemented using computer instruction stored in persistent storage that when executed by a processor of the client gives rise to the agent (106). The agent (106) may be implemented using a physical device. For example, the agent (106) may be implemented using an integrated circuit having circuitry adapted to provide the functionality of the agent (106). The circuitry may be adapted to provide the functionality of the agent (106) by including different portions of circuitry that provide different portions of the functionality of the agent (106).

Figure 3:
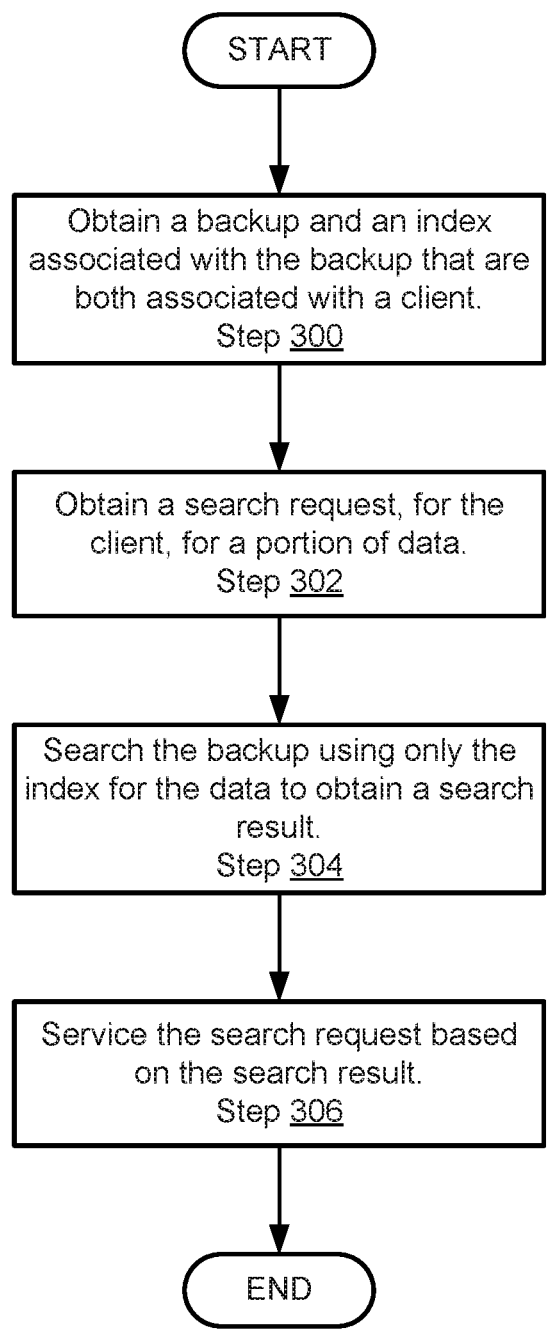
FIG. 3 shows a flowchart of a second method of providing backup services in accordance with one or more embodiments of the invention.

When providing its functionality, the agent (106) may perform all, or a portion, of the methods illustrated in FIGS. 2-3.

While the client (104) is illustrated in FIG. 1.1 as including an agent (106), the client (104) may include additional, fewer, and/or different components from those discussed above without departing from the invention.

The backup manager (100) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform all, or a portion, of the functions described in this application and/or all, or a portion, of the methods illustrated in FIGS. 2-3. The backup manager (100) may be implemented using other types of computing devices without departing from the invention. For additional details regarding computing devices, refer to FIG. 5.

The backup manager (100) may be implemented using logical devices without departing from the invention. For example, the backup manager (100) may be implemented using virtual machines that utilize computing resources of any number of physical computing devices to provide the functionality of the backup manager (100). The backup manager (100) may be implemented using other types of logical devices without departing from the invention.

In one or more embodiments of the invention, the backup manager (100) provides backup services to the client (104) and/or other entities. Providing backup services may include (i) orchestrating generation of backups of the client (104), (ii) orchestrating storage of the backups in the backup storage (110), (iii) searching backups stored in the backup storage (110) for portions of data (e.g., particular files), (iv) providing data from the backups stored in the backup storage (110), and/or (v) orchestrating restoration of the client (104) using the backups stored in the backup storage (110).

To provide its functionality, the backup manager (100) may include a backup orchestrator (102) that provides the above noted functionality of the backup manager (100) and/or includes functionality to send messages to entities (e.g., an agent (106)) hosted by the client (104) to invoke functionality of the entities (e.g., agent (106)). For example, the agent (106) hosted by the client (104) may service requests from the backup manager (100). The agent (106) may, upon receipt of such requests, invoke functionality of the client (104) and/or its own functionality to service the requests from the backup manager (100).

The backup storage (110) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform all, or a portion, of the functions described in this application and/or all, or a portion, of the methods illustrated in FIGS. 2-3. The backup storage (110) may be implemented using other types of computing devices without departing from the invention. For additional details regarding computing devices, refer to FIG. 5.

The backup storage (110) may be implemented using logical devices without departing from the invention. For example, the backup storage (110) may be implemented using virtual machines that utilize computing resources of any number of physical computing devices to provide the functionality of the backup storage (110). The backup storage (110) may be implemented using other types of logical devices without departing from the invention.

In one or more embodiments of the invention, the backup storage (110) provides data storage services to the client (104) and/or other entities. Data storage services may include storing data and providing copies of previously stored data. For example, backups of the client (104) and/or other entities may be stored in the backup storage (110) for storage.

The data stored in the backup storage (110) may include backups of the client (104) and/or backup indexes associated with the backups. Copies of the backup indexes may also be stored in the backup manager (100).

While the system of FIG. 1.1 has been illustrated as including a limited number of specific components, a system in accordance with embodiments of the invention may include additional, fewer, and/or different components without departing from the invention. For example, the system may include any number of clients (e.g., 104), backup managers (e.g., 100) that provide backup services to all or a portion of the clients, backup storages (110) that provide backup services to any number of entities, and/or other entities without departing from the invention. Any of the aforementioned components may cooperate to provide the above noted and later described functionality of the system of FIG. 1.1.

As discussed above, the client (104) may generate backups and backup indexes as part of the process of backing up the client's (104) data. To further clarify aspects of data stored by the client, a diagram of an example storage of the client (104) is illustrated in FIG. 1.2.

Turning to FIG. 1.2, FIG. 1.2 shows a diagram of an example client storage (120) in accordance with embodiments of the invention.

In one or more embodiments of the invention, the example client storage (120) is implemented using devices that provide data storage services (e.g., storing data and providing copies of previously stored data). The devices that provide data storage services may include hardware devices and/or logical devices. For example, the example client storage (120) may include any quantity and/or combination of memory devices (i.e., volatile storage), long term storage devices (i.e., persistent storage), other types of hardware devices that may provide short term and/or long-term data storage services, and/or logical storage devices (e.g., virtual persistent storage/virtual volatile storage).

For example, the example client storage (120) may include a memory device (e.g., a dual in line memory device) in which data is stored and from which copies of previously stored data are provided. In another example, the example client storage (120) may include a persistent storage device (e.g., a solid state disk drive) in which data is stored and from which copies of previously stored data is provided. In a still further example, the example client storage (120) may include a memory device (e.g., a dual in line memory device) in which data is stored and from which copies of previously stored data is provided and a persistent storage device that stores a copy of the data stored in the memory device (e.g., to provide a copy of the data in the event that power loss or other issues with the memory device that may impact its ability to maintain the copy of the data cause the memory device to lose the data).

The example client storage (120) may store data structures including a backup (122) and a backup index (124). Each of these data structures is discussed below.

The backup (122) may be a data structure that includes information regarding the state of the client (104, FIG. 1.1) at a point in time, changes to the state of the client (104, FIG. 1.1) over a period of time, and/or other types of information reflecting the state of the client. The backup (122) may be usable, in isolation or in combination with other backups, to restore a state of the client (104, FIG. 1.1) to a previous state associated with the backup (122) and/or other backups.

For example, a backup that reflects the state of the client (104, FIG. 1.1) at a point in time may include a copy of all, or a portion, of the client's data at a point in time (e.g., a full backup). Such a backup may be implemented as, for example, an image of the client (or a portion of the client).

In another example, a backup that reflects changes to the state of the client (104, FIG. 1.1) over a period of time may include changes made to all, or a portion, of the client's data over the period of time. Such a backup may be implemented as, for example, a list of modifications to all of the client's data (e.g., an incremental backup) or a list of modifications to a particular portion of the client's data (e.g., a transaction log from an application hosted by the client). Backups that reflect changes to the state of the client over a period of time may be used in combination with at least one other backup that reflects the state of the client at a point in time (e.g., the state of the client at a point in time in combination with changes to the state of the client over a period of time may be used to derive the state of the client at a second point in time). Multiple backups that reflect changes to the state of the client over multiple periods of time may be used in combination (e.g., chaining) to derive the state of the client at any number of different points in time.

The backup (122) may have an organizational structure that reflects the organizational structure utilized by the client to organize its data. Consequently, the backup (122) may include organization data (e.g., allocation tables) that specifies the logical arrangement of client data and/or system metadata within the backup. For additional details regarding the arrangement of client data and/or system metadata within the backup (122), refer to FIG. 1.3.

The backup index (124) may be a data structure that includes information regarding the client's data included in the backup (122). The information may include where different portions of the client's data is disposed within the backup (122) and/or information regarding the content of each of the different portions of the client's data.

For example, the backup index (124) may specify locations (e.g., offsets, lengths, etc.) of logical portions (e.g., files) of the client's data within the backup (122). The backup index (124) may also specify information (e.g., name, creation date, type, description of the contents, etc.) regarding the content of each of the logical portions of the client's data.

The backup index (124) may be used to enable the contents of the backup (122) to be searched and/or to enable particular portions of the content of the backup (122) to be extracted. For example, the backup index (124) may be implemented as a table that specifies both information regarding each portion of the client's data and where each portion of the client's data is disposed within the backup (122). Consequently, when a desirable portion of the client's data is identified using the information regarding the portion, the corresponding information regarding the location of the desirable portion may be used to read or otherwise access the portion of the backup (122) corresponding to the desirable portion.

In one or more embodiments of the invention, the backup index (124) is generated without crawling (e.g., reading the client's data included in the backup (122) and deriving information based on the read client's data of the backup (122)) the backup (122). Rather, the backup index (124) may be generated based on (i) organization information included in the backup (122) and (ii) system metadata. By doing so, the backup index (124) may be generated without expending computing resources on analyzing the client's data included in the backup to generate information regarding the client's data. For example, the preexisting system metadata that already includes information regarding the client's data may be utilized to generate the backup index.

While the example client storage (120) has been illustrated as including data structures including a limited amount of specific information, any of the data structures stored in the example client storage (120) may include additional, less, and/or different information without departing from the embodiments of the invention. Further, the aforementioned data structures may be combined, subdivided into any number of data structures, may be stored in other locations (e.g., in a storage hosted by another device), and/or spanned across any number devices without departing from embodiments of the invention. Any of the aforementioned data structures may be implemented using, for example, lists, tables, linked lists, databases, and/or other types of data structures.

To further clarify aspects of backups, a diagram of an example backup (130) in accordance with one or more embodiments of the invention is illustrated in FIG. 1.3. As discussed above, the example backup (130) may store information regarding the state of the client (104, FIG. 1.1). In FIG. 1.3, the example backup (130) reflects a state of the client (104, FIG. 1.1) at a point in time. However, the description provided below may be applicable to other types of backups that reflect changes to the client's state over corresponding periods of time.

The example backup (130) may include any number of blocks (132, 142) that corresponding to blocks of an organization scheme employed by the client (104, FIG. 1.1) to store data. A block may be a chunk of storage resources (e.g., a number of bits). The size of the blocks may correspond to a minimum addressable unit of storage resources.

Each of the blocks (132, 142) may include bits that the client (104, FIG. 1.1) may use to store information. The client (104, FIG. 1.1) may store information using the bits of each of the blocks that reflects (i) organization information (e.g., any number of allocation tables (e.g., 134)) used by the client to organize its data, (ii) the client's data (e.g., any number of data portions (e.g., 136, 140), and/or (iii) system metadata (e.g. any number of system metadata portions (e.g., 138)) that includes information regarding any number of logical portions of the client's data. Different blocks of the example backup (130) may include different types of information.

The arrangement of organization information, client data, and system metadata within each of the blocks may correspond to the manner in which the client organizes its data. For example, if the client runs a first type of operating system, the client may store different portions of the aforementioned types of information in a manner consistent with the first type of operating system. If the client runs a second type of operating system, the client may store different portions of the aforementioned types of information in a manner consistent with the second type of operating system. Thus, the arrangement of organizational information, client data, and system metadata within a backup may be identifiable based on the type of operating system (or other type of data organization system) utilized by the client.

To generate backup indexes, embodiments of the invention may provide a method that utilizes organizational information and system metadata already present within backups and that was previously generated by the client to generate backup indexes. For example, based on an operating system employed by the client, a method in accordance with embodiments of the invention may include (i) identifying the location of organization information (e.g., one or more allocation tables (e.g., 134) or other types of data structures that specify the relative location of logical portions of client data and/or system metadata) within a backup, (ii) reading the organization information to identify the location of data and system metadata, (iii) reading the system metadata, and (iv) generating the backup index using the system metadata and relative logical portions of the client data. For additional details regarding generating and/or using backup indexes, refer to FIGS. 2-3.

As discussed above, blocks may store different types of information to enable a client to organize its data. The blocks may include, for example, organizational information such as an allocation table (134). An allocation may be any number of bits that specify the location of logical portions of client data (e.g., data portions (136, 140)) and/or system metadata that includes information regarding the logical portions of the client data within a backup.

For example, an allocation table (134) may specify block identifier(s), an offset, a length, and/or other types of information that enables one or more logical portions of client data and/or system metadata to be identified as being stored within the bits of the blocks. While the organizational information has been described with respect to an allocation table (134), the organization information may be other types of data structures, include different types of information, and/or other enables client data and/or system metadata to be identified within a backup.

The blocks (132, 142) may also include any number of logical portions of client data and/or system metadata associated with the logical portions of the client data. The logical portions of the client data may include, for example, files or other types of data structures used by the client to store data. The system metadata may specify information regarding the logical portions of the client data such as, for example, names, creation dates, information describing the contents, and/or other types of information associated with the logical portions of the client's data.

While the example backup (130) has been illustrated as including data structures including a limited amount of specific information, any of the data structures included in the example backup (130) may include additional, less, and/or different information without departing from the embodiments of the invention. Any of the aforementioned data structures may be implemented using, for example, lists, tables, linked lists, databases, and/or other types of data structures.

As discussed above, the system of FIG. 1.1 may utilize backups and backup indexes. FIGS. 2-3 show methods that may be performed by components of the system of FIG. 1.1 to provide backup services.

FIG. 2 shows a flowchart of a method in accordance with one or more embodiments of the invention. The method depicted in FIG. 2 may be used to provide backup generation services in accordance with one or more embodiments of the invention. The method shown in FIG. 2 may be performed by, for example, a backup manager (e.g., 100, FIG. 1.1). Other components of the system in FIG. 1.1 may perform all, or a portion, of the method of FIG. 2 without departing from the invention.

While FIG. 2 is illustrated as a series of steps, any of the steps may be omitted, performed in a different order, additional steps may be included, and/or any or all of the steps may be performed in a parallel and/or partially overlapping manner without departing from the invention.

In step 200, a backup for a client is generated.

In one or more embodiments of the invention, the backup is generated by sending a message to an agent hosted by the client. In response to receiving the message, the agent hosted by the client may (i) generate the backup or (ii) invoke backup generation functionality of another entity hosted by the client to generate the backup. For example, applications hosted by the client may include native backup generation functionality.

In step 202, a portion of the backup that includes an allocation scheme is identified.

In one or more embodiments of the invention, the allocation scheme specifies how the client organizes all or a portion of its information. For example, the allocation scheme may be specified, at least in part, by an allocation table or another type of data structure, as described with respect to FIG. 1.3.

In one or more embodiments of the invention, the allocation scheme is identified based on an operating system hosted by the client that organizes the client's data in persistent storage. As discussed above, different types of operating systems may employ different organizational schemes for storing of data in persistent storage. Consequently, the specific organization scheme and corresponding locations of storing allocation schemes may be identified based on the type of operating system hosted by the client.

The allocation scheme may specify where data and system metadata are stored in persistent storage. Consequently, similar data may be stored in similar relative locations within the backup generated in step 200. For example, the allocation scheme may be specified by allocation tables that specify offsets, lengths, and/or other types of information that enable the relative storage locations of different portions of data and system metadata within the generated backup.

In step 204, system metadata is extracted from the backup using the allocation scheme. The system metadata may be extracted by reading various portions of the system metadata from the generated backup using the organizational information of the allocation scheme identified in step 202.

In step 206, an index for the backup is generated using the extracted system metadata. The index may be generated by generating a new data structure or adding data to an existing data structure. The index may include system metadata all, or a portion, of the client data stored in the backup. The index may also include corresponding access information (e.g., offsets, lengths, etc.) for each of the portions of the client's data stored in the generated backup.

The index may include any type and quantity of information regarding the client data stored in the backup that corresponds to information based on the system metadata. For example, the index (e.g., backup index) may specify the name of each portion of client data, information regarding each portion of client data, etc.

The index may be implemented as, for example, a table. The index may be implemented as different types of data structures (e.g., lists, linked lists, database entries, etc.) without departing from the invention.

In step 208, the backup and the index are stored in backup storage. Once stored in backup storage, the backup storage may aggregate the information included in the index with information obtained from other indexes associated with other backups. Consequently, the aggregated information may be used to search all of the backups stored in the backup storage for relevant information. Any number of copies of the aggregated indexes may be distributed to any number of other entities to enable the other entities to provide search functionality for the data included in the backups stored in the backup storage.

The method may end following step 208.

Throughout the method illustrated in FIG. 2, the backup manager (100, FIG. 1.1) may send messages to the agent (106, FIG. 1.1) to cause the method illustrated in FIG. 2 to be performed. The backup manager (100, FIG. 1.1) may cause the backup to be generated based on protection policies or other information that specifies when backups for entities should be generated to meet data integrity requirements.

By generating the backup and backup index as illustrated in FIG. 2, the data stored in the generated backup may be searched in a computationally efficient manner that does not require the contents of the backup to be indexed via crawling or other computationally expensive methods. Consequently, the computational cost for providing backup services including search functionality may be reduced.

Turning to FIG. 3, FIG. 3 shows a flowchart of a method in accordance with one or more embodiments of the invention. The method depicted in FIG. 3 may be used to provide search functionality in accordance with one or more embodiments of the invention. The method shown in FIG. 3 may be performed by, for example, a backup manager or a backup storage (e.g., 100, 110, FIG. 1.1). Other components of the system in FIG. 1.1 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, a backup and an index associated with the backup and that are both associated with a client are obtained. The backup and index may be obtained from the client. For example, the client or another entity may send the backup and/or the index to a backup storage for storage.

In step 302, a search request, for the client, for a portion of data is obtained. The portion of data may be any type of data. For example, the portion of data may be a document.

The search request may be obtained from another entity via a message. The search request may request whether the portion of the data is available for access. The search request may generally request whether any entity (e.g., the client) may provide access to the portion of data or whether a specific entity (i.e., the client) may provide access to the portion of data.

In step 304, the backup is searched for the data using only the index to obtain a search result. In other words, the backup is not searched directly. Rather, the search request is serviced by determining whether any information included in the index indicates that the portion of the data is included in the backup.

For example, an identifier of the portion of the data may be matched to identifiers (e.g., file names) included in the index. In another example, a creation date associated with the portion of the data may be matched to creation times included in the index. If a match is found, it may be determined that the portion of the data is included in the backup.

The search result may reflect the outcome of the determination. For example, if it is determined that the portion of the data is included in the backup, the search result may (i) indicate that the portion of the data is available, (ii) may specify from which entity the portion of the data may be accessed, (iii) may include the portion of the data (e.g., may be read from the backup using access information corresponding to the portions of the data), and/or (iv) may include other types of information regarding the portion of the data. If it is determined that the portion of the data is not included in the backup, the search result may indicate that the portion of the data is inaccessible from the client associated with the backup.

In step 306, the search request is serviced based on the search result. For example, a message based on the search result may be provided to the requesting entity in response to the search request. The message may, for example, include the search result and/or information based on the search result.

The method may end following step 306.

Thus, via the method illustrated in FIG. 306, search functionality for data included in the backups in backup storage may be provided in a computationally efficient manner by utilizing information included in backup indexes associated with the backups. By doing so, search results may be generated without resorting to computationally expensive methods of searching data included in the backups such as, for example, crawling the backups.

To further clarify embodiments of the invention, a non-limiting example is provided in FIGS. 4.1-4.3. FIG. 4.1 may illustrate a system similar to that illustrated in FIG. 1.1. FIGS. 4.2-4.3 may illustrate interactions between components and/or actions performed by the components of the system of FIG. 4.1 over time. For the sake of brevity, only a limited number of components of the system of FIG. 1.1 are illustrated in each of FIGS. 4.1-4.3.

EXAMPLE

Consider a scenario as illustrated in FIG. 4.1 in which a backup manager (400) is providing backup services to a client (402). When providing backup services, the backup manager (400) may orchestrate storage of backups in a backup storage (404).

Turning to FIGS. 4.2-4.3, the aforementioned figures illustrate interactions and actions between components of the system of FIG. 4.1. In these figures, the relative occurrence in time of the interactions progresses from the top of each figure (i.e., earlier in time) to the bottom of each figure (i.e., later in time). FIG. 4.3 is a continuation of the diagram of FIG. 4.2. In other words, element 410 indicates the first interaction that occurs in time while element 434 indicates the last interaction that occurs.

Turning to FIG. 4.2, at a first point in time, the backup manager (400) initiates a backup generation (410) for the client (402). The backup manager (400) may initiate the backup generation (410) to meet a data protection policy requirement. The backup manager (400) may initiate a backup generation (410) by sending a message to an agent hosted by the client (402).

In response to initiation of the backup generation (410), the agent generates a backup (412). The generated backup may be any type of backup. For example, the backup may be an image of the client (402).

After generating the backup, an allocation scheme of the backup (414) is identified. The allocation scheme may be identified based on a type of operating system that organizes the client's data. The organization scheme may specify one or more locations within the client's data that include organizational information such as allocation tables or other types of data structures that specify the starts/stops/lengths of portions of the client's data such as files.

After the allocation scheme is generated, an index for the backup is generated based on the allocation scheme (416). The index is generated by reading system metadata from the backup using the allocation tables or other types of data structures that specify where data and system metadata is stored. Once read, the index is generated by associating the system metadata associated with each of the portions of the client data with access information for each of the portions of the client data. The access information may include the start/stop/length or other types of information that enables corresponding portions of the client data to be read from the backup.

After generating the index, the backup and index (420) are provided to the backup storage (404). The backup and index (420) may be provided by sending a copy of each to the backup storage (404).

After receiving the backup and index (420), the backup storage (404) stores the backup and the index (422). When storing the index, the backup storage (404) may aggregate the information included in the index with information from other indexes to generate an index that reflects the data of multiple backups stored in the backup storage (404). When aggregating the information, a new data structure may be generated, or auxiliary information may be generated that facilitates efficient searching of multiple indexes corresponding to multiple backups.

After the backup an index are stored, a request for data (424) is obtained by the backup manager (400). The request may be obtained from any entity. The request may ask whether the data (424) is available from any entity (e.g., entities for which backups are stored in the backup storage (404).

Turning to FIG. 4.3, after obtaining the request, the backup manager (400) sends a search request for the data (426) to the backup storage (404). In response to receiving the search request for the data (426), the backup storage (404) searches the index for the data (428).

To search the index for the data (428), the backup storage (404) attempts to match a name of the data to any names included in the index. In this example, the name is included in the index and, consequently, the backup storage (404) determines that the data is accessible via the client (402). However, if it was determined that the data was unavailable (i.e., not matched to any portion of the index), the backup storage (404) may search other indexes for the data until a match is found or it is determined that the name does not match any portion of any index.

After the name of the data is matched to a portion of the index, the location of the data in the backup (430) is identified. The location of the data is identified based on the organizational information (e.g., offset, length, etc.) included in the index and associated with the matched portion of the index.

Using the location, the backup storage (404) extracts the data (432) from the backup by reading the data from the backup. After extracting the data (432), the data is provided to the requestor (434) as a search result.

END OF EXAMPLE

Thus, as illustrated in FIGS. 4.1-4.3, embodiments of the invention may provide a method for providing backup services in a manner that is computationally efficient. For example, the backup was stored in a format that enabled the contents of the backup to be searched without crawling the backup.

Figure 5:
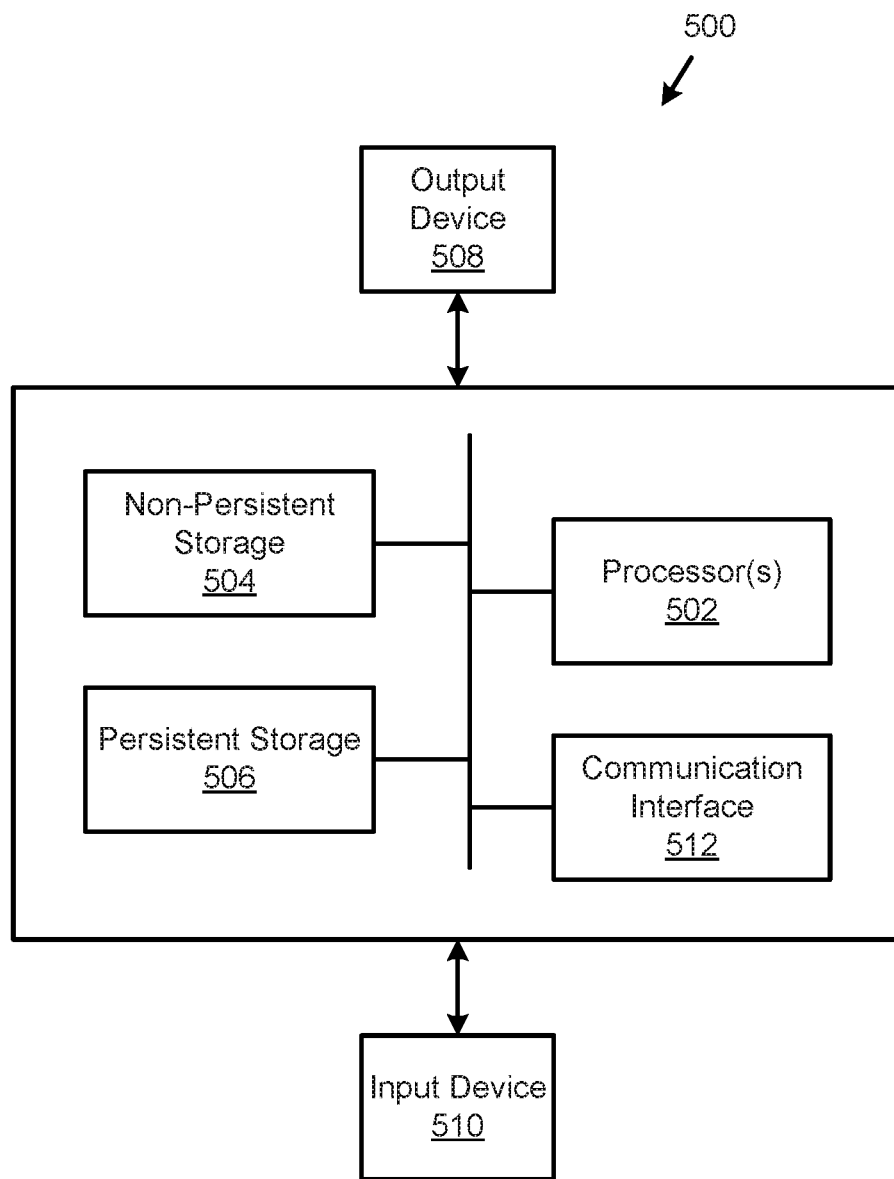
FIG. 5 shows a diagram of a computing device in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide a method for providing backup services. To do so, embodiments of the invention may provide a system that generates searchable backups in a computationally efficient manner. To place the backups into a format that enables computational efficient searching, allocation schemes of entities for which the backups are generated may be utilized to identify different logical portions of a backup and corresponding system metadata embedded in the backups, which the entities previously generated. The identified allocation schemes and system metadata may be used to generate an index for the backup that enables the contents of the backup to be searched without crawling the backup or otherwise employing computationally expensive manners of characterizing the contents of the backups. By doing so, the computational cost for placing generated backups in a searchable format may be reduced.

Thus, embodiments of the invention may address the problem of limited computational resource availability for providing backup services in a distributed environment.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A backup manager for providing backup services, comprising:
    persistent storage for storing protection policies; and
    a backup orchestrator programmed to:
        generate a backup for a client based on the protection policies;
        identify a portion of the backup that includes an allocation scheme;
        extract system metadata from the backup using the allocation scheme;
        generate an index for the backup using the system metadata, wherein the index is generated without crawling the backup by utilizing organizational scheme metadata of the system metadata employed by the client to organize data and wherein the index specifies offsets, from starts of respective blocks of the backup, to portions of the respective blocks of the backup that correspond to logical portions of client data of the client; and
        store the backup and the index in backup storage.

2. The backup manager of claim 1, wherein the backup orchestrator is further programmed to:
    obtain a request for data;
    search the backup for the requested data using the index to obtain a search result; and
    service the request using the search result.

3. The backup manager of claim 2, wherein servicing the request using the search result comprises:
    obtaining a portion of the backup based on the search result; and
    providing the portion of the backup to a requesting entity.

4. The backup manager of claim 1, wherein the backup is a blocked based backup.

5. The backup manager of claim 4, wherein the block based backup comprises the allocation scheme, client data, and the system metadata stored in blocks of the block based backup.

6. The backup manager of claim 1, wherein the logical portions of the client data are files.

7. A method for providing backup services, comprising:
    generating a backup for a client based on a protection policy associated with the client;
    identifying a portion of the backup that includes an allocation scheme;
    extracting system metadata from the backup using the allocation scheme;
    generating an index for the backup using the system metadata, wherein the index is generated without crawling the backup by utilizing organizational scheme metadata of the system metadata employed by the client to organize data, and wherein the index specifies offsets, from starts of respective blocks of the backup, to portions of the respective blocks of the backup that correspond to logical portions of client data of the client; and
    storing the backup and the index in backup storage.

8. The method of claim 7, further comprising:
    obtaining a request for data;
    searching the backup for the requested data using the index to obtain a search result; and
    servicing the request using the search result.

9. The method of claim 8, wherein servicing the request using the search result comprises:
    obtaining a portion of the backup based on the search result; and
    providing the portion of the backup to a requesting entity.

10. The method of claim 7, wherein the backup is a blocked based backup.

11. The method of claim 10, wherein the block based backup comprises the allocation scheme, client data, and the system metadata stored in blocks of the block based backup.

12. A non-transitory computer readable medium comprising computer readable program code, which when executed by a computer processor enables the computer processor to perform a method for providing backup services, the method comprising:
    generating a backup for a client based on a protection policy associated with the client;
    identifying a portion of the backup that includes an allocation scheme;
    extracting system metadata from the backup using the allocation scheme;
    generating an index for the backup using the system metadata, wherein the index is generated without crawling the backup by utilizing organizational scheme metadata of the system metadata employed by the client to organize data, and wherein the index specifies offsets, from starts of respective blocks of the backup, to portions of the respective blocks of the backup that correspond to logical portions of client data of the client; and
    storing the backup and the index in backup storage.

13. The non-transitory computer readable medium of claim 12, wherein the method further comprises:
    obtaining a request for data;

searching the backup for the requested data using the index to obtain a search result; and servicing the request using the search result.

14. The non-transitory computer readable medium of claim 13, wherein servicing the request using the search result comprises:

obtaining a portion of the backup based on the search result; and providing the portion of the backup to a requesting entity.

15. The non-transitory computer readable medium of claim 12, wherein the backup is a blocked based backup.

16. The non-transitory computer readable medium of claim 15, wherein the block based backup comprises the allocation scheme, client data, and the system metadata stored in blocks of the block based backup.

* * * * *